Jan. 10, 1950      W. S. LANDON      2,494,395
MAGNETICALLY OPERATED SAFETY VALVE CLOSING DEVICE
Filed Jan. 13, 1944

INVENTOR.
Walter S. Landon
BY
Andrew K. Foulds
his ATTORNEY

Patented Jan. 10, 1950

2,494,395

UNITED STATES PATENT OFFICE 2,494,395

MAGNETICALLY OPERATED SAFETY VALVE CLOSING DEVICE

Walter S. Landon, Detroit, Mich., assignor to Detroit Lubricator Company, Detroit, Mich., a corporation of Michigan Application January 13, 1944, Serial No. 518,057

8 Claims. (137—68)

The invention relates to fluid control valves and it has particular relation to a float valve for controlling the flow of liquids.

In certain respects the invention constitutes an improvement over that embodied in the co-pending application for patent of Phillip S. Russel, Serial Number 483,593, filed April 19, 1943, now Patent No. 2,387,858, granted October 30, 1945.

In connection with the present invention, as well as that embodied in the co-pending application for patent, it is desirable in the case of a float valve, and especially one for controlling the flow of liquid fuel, to provide means for positively closing the valve in the event the action of the float does not properly control closing action of the valve. In the co-pending application, in the event the valve should not move properly in the closing direction, continued upward movement of the float causes, through magnetic attraction, the release of a valve striking means desired to forcefully close the valve. The present invention relates to improvements over that embodied in such co-pending application.

One object of the present invention is to provide a safety valve closing device operated through magnetic forces, which embodies fewer parts and which is less expensive to manufacture.

Another object of the invention is to provide an improved device of the character mentioned wherein magnetic attraction provides a direct valve striking force so as to thereby eliminate separate force developing means such as springs.

Another object of the invention is to provide an improved safety valve closing device operable magnetically which acts to close the valve both when the level of the liquid is too high and when it is too low.

Other objects of the invention will become apparent from the following description, from the drawing to which it relates and from the claims hereinafter set forth.

For a better understanding of the invention reference may be had to the accompanying drawing wherein.

Figure 1:
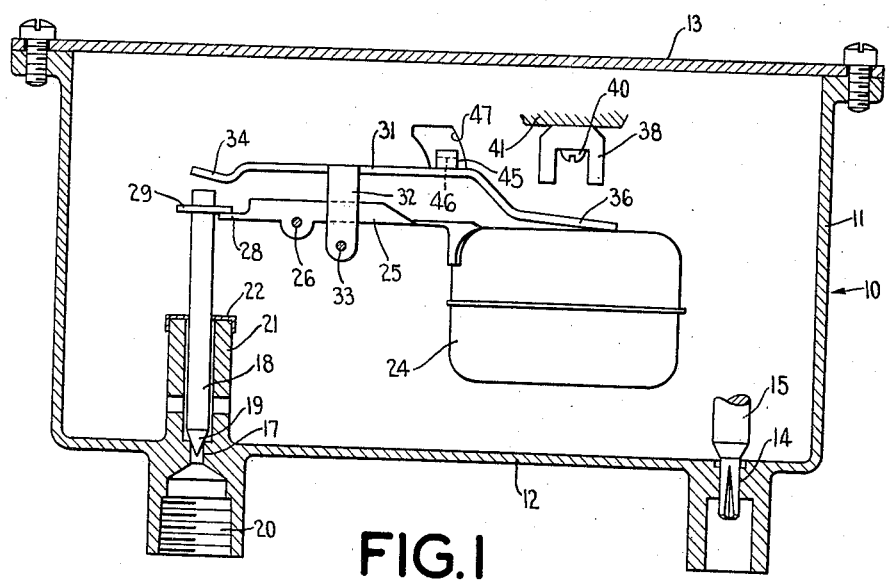
Figure 1 shows a vertical cross-section of a safety valve device constructed according to one form of the invention.

Referring to the drawing, a valve casing is indicated at 10 and may comprise an annular side wall 11, a bottom wall 12, and a releasable cover 13. The bottom wall is shown as having a valve opening 14 and metering valve 15 and the purpose of such valve in one application of the invention is to meter fuel oil to a fuel burning device. This oil flows from the casing 11 and downwardly through the port 14.

A second valve provided for feeding fuel oil into the casing 11 includes a port 17 in the bottom wall 12 and a valve stem 18 having a conical lower end 19 for adjustably controlling flow through the port. Below the port, a fuel line connection, not shown, may be threaded into a threaded projection 20 on the bottom wall 12 so that the fuel oil may be conducted upwardly into the casing. The stem 18 is slidable vertically in an upwardly directed projection 21 on the wall 12 and through a guide 22 on the upper end of the projection and it normally closes through the action of gravity.

For normally opening the valve and allowing it to close, depending upon the amount of liquid fuel within the casing, a float 24 is provided which is attached to an arm 25 pivoted at 26 on a pin projecting from the casing wall 11. At the side of the pin opposite the float 24, the arm 25 has a lip 28 which projects under a collar 29 on the upper end of the valve stem. From this, it is apparent that when the level of the liquid drops the valve opens and when the level of the liquid rises sufficiently the stem moves towards or into its closed position so as to control or shut off the admission of fuel.

The safety device for forcefully closing the valve stem in the event closing movement thereof is impeded by slight sticking or by some foreign matter interfering with tight seating of the valve, as by becoming lodged on the seat or the conical end of the stem, includes an arm or lever 31 having a leg 32 pivoted as indicated at 33 on a pin fastened to the casing wall 11. This arm 31 has one end 34 extending over the upper end of the valve stem, while its other end has a flat portion 36 normally resting on the upper surface of the float. The arm 31, or at least the flat portion 36 thereof, is constructed from a metal attracted by magnetic forces and such armature portion is disposed in vertical alignment with a permanent magnet 38 fastened to the casing 10 in any suitable manner. The magnet is shown as fastened by a screw 40 to a part 41 and this part may be in turn secured to the cover 13 or to the side wall 11.

In the normal operation of the device, the valve stem 18 reciprocates slightly so as to control the amount of liquid in the casing 10 without causing the float to move upwardly a sufficient amount as to place the armature 36 in a position where it will be pulled upwardly by the magnet. In other words, the armature 36 rests on the float and the float fluctuates vertically so as to maintain the desired height of liquid. If, however, the valve does not completely close, when necessary, or if it does not close sufficiently as to reduce the amount of oil entering the casing when required, and the float continues its upward movement due to continued rising of the oil level, the float will carry the armature 36 nearer to the permanent magnet. When this movement of the armature into the magnetic field of the magnet is sufficient, the magnetic forces of attraction are such as to overcome the gravitational forces and the armature is rapidly snapped upwardly. This causes the arm 31 to swing quickly about its pivot 33 and the end 34 of the arm to forcefully and quickly strike the upper end of the valve stem. Closing movement of the valve thus normally will be assured.

For re-setting the device for normal operation, a manual operating member comprising an upright tab 45 is provided on arm 31 and this tab has a finger 46 projecting laterally through a slot 47 in the wall 11 so that the finger is accessible outside the casing. When the arm is in its upper position and it is desired to re-set the device, the finger is pushed downwardly to break the arm away from the magnet. It may be noted, too, that the arm 31 might be raised at any time also so that if desired the valve 18 could be closed against the action of the float, as for example when the chamber 10 is empty.

Figure 2:
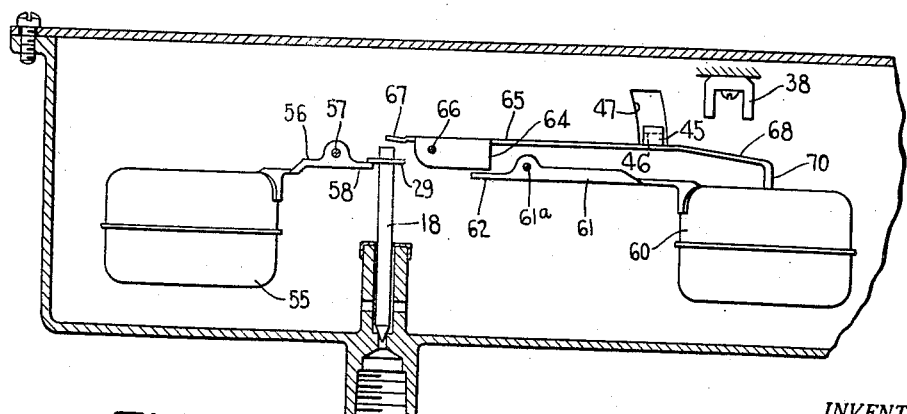
Figure 2 is a similar view illustrating another form of the invention.

Referring now to Figure 2, the same kind of inlet valve is shown, but in this case two float devices are employed, both of which cooperate with the single valve stem 18. One of the floats indicated at 55 has an arm 56 pivoted on a pin 57 secured to the casing and this arm terminates in a lip 58 engaging under the collar 29 on the valve stem. During normal operation, the float 55 governs the position of the valve stem so that the desired level of oil or liquid will be maintained in the casing.

The safety means in this device comprises a second or safety float 60 having an operating lever or arm 61 pivoted on a pin 61a secured to the casing side wall. Such arm, at the side of the pivot opposite the float, has a short lip 62 which projects under a leg or flange 64 depending from a striker arm or safety lever 65. This striker arm is pivoted on a pin 66 connected to the casing wall and has a projection 67 overlying the upper end of the valve stem. At its opposite end, the striker arm has an armature portion 68 adapted to be attracted by the permanent magnet 38 and also such end of the arm has a leg 70 normally resting on the upper surface of the float 60. A re-setting finger 46, which may be the same as that shown in Figure 1, is provided for re-setting the safety device.

As stated previously, the float 55 normally maintains the desired level of liquid in the casing by opening the valve and allowing it to close or move towards closed position depending upon the level of the liquid. During such operation of the float 55, the float 60 likewise moves in the same manner but its operation is idle. However, in the event the level of the liquid should rise an undesirable amount through failure of the valve stem to close sufficiently or completely, the float 60, through its continued upward movement raises the leg 70 and hence the armature 68 to a point where the armature is picked up by the magnet 38 and then the striker arm is forcefully swung about its pivot 66. This swinging of the striker arm forcefully causes the lip 67 to strike the valve stem so as to close it and thereby shut off the entry of more liquid.

Conversely, if the level of the liquid should fall to an undesirably low point, downward movement of the float 60 will cause the end 62 of arm 61 to move the striker arm about its pivot 66 so as to again throw the armature 68 upwardly towards the magnet. If the movement is sufficient, the magnet picks up the striker arm and forcefully strikes the valve stem so as to move it into valve closing position. In this case, the downward movement of the valve stem from an open position will require raising of the float 55 but it is to be understood that the magnetic force is sufficient to accomplish this result.

In either case, therefore, that is, with a low liquid level or with a high liquid level, the valve stem is forcefully struck so as to close it and shut off the supply of liquid or fuel oil. This condition is maintained until the re-setting pin 45 is moved downward to break the striker arm away from the magnet, although if the re-setting pin is moved downwardly prior to bringing the level of the liquid back to normal it would be necessary to hold the pin in pressed down position until the level approximately reaches normal. It should be understood that a metering valve or other outlet valve 15 will be used in the device shown by Figure 2 as is shown in Figure 1.

Although more than one form of the invention has been illustrated and described in detail, it will be apparent to those skilled in the art that various modifications may be made without departing from the scope of the appended claims.

What is claimed is:

1. In combination, a liquid float chamber, a valve for controlling the flow of liquid into said chamber and including a movable valve closing element, a float in the chamber, lost-motion means operatively connecting the float and element for controlling the flow of liquid into and the level thereof in the chamber, and a striker element pivotally mounted in the casing and having a portion arranged to strike the valve element and a second portion arranged to be raised by the float and which is constructed of metal attracted by magnetic forces, and a magnet in the casing and arranged so that upon sufficient upward lost-motion movement of the float, said second portion of the striker element is moved into the magnetic field of said magnet sufficiently to cause the striker element to be forcefully moved against the valve element by magnetic forces.

2. In combination, a liquid float chamber, a valve for controlling the flow of liquid into said chamber and including a movable valve closing element, a float in the chamber, lost-motion means operatively connecting the float and element for controlling the flow of liquid into and the level thereof in the chamber, a striker element pivoted intermediate its ends in the casing and having one end arranged to strike the valve element and move the latter towards closed position and having its other end arranged to be raised by the float and constructed of metal attracted by magnetic forces, and a magnet in the casing and arranged so that upon sufficient upward lost-motion movement of the float said other end of the striker element is moved into the magnetic field of said magnet sufficiently to cause the striker element to be forcefully swung about its pivot by magnetic attraction.

3. In combination, a liquid float chamber, a valve for controlling inlet of liquid into the chamber and including a vertically movable stem, float means including an arm pivoted intermediate its ends in the chamber, and a float on one end of the arm, means operatively connecting the arm to the stem to cause the stem to be lifted when the float descends while allowing the arm to move independently of the stem when the float rises, a striker arm pivoted intermediate its ends in the casing and having a portion adapted to strike the valve stem and move it towards valve closing position when the arm is pivoted in one direction and having a second portion engaged by the float means so as to be moved upwardly in said same pivotal direction upon rising of the float, said striker arm being normally biased to move with the rise of the float but also being pivotal in said pivotal direction independently of the float means, and a portion thereof being constructed of magnetic metal, and a magnet in the chamber having its field in the path of movement of the magnetic portion of the striker arm so that if the latter rises sufficiently its movement is forcefully advanced by magnetic attraction in order to deliver a striking blow to the valve stem.

4. In combination, a liquid float chamber, a valve for controlling the flow of liquid into said chamber and including a movable valve element, a float for normally controlling opening and closing movements of the valve so as normally to maintain a certain liquid level, a striker for delivering a forceful blow to the valve stem to move it towards closed position, and means including a second float in the casing and magnetic means for operating the striker in the event the liquid reaches either a high level or a low level.

5. In a liquid level control device, a casing having a liquid receiving chamber with an inlet, a valve controlling flow through said inlet, a pair of superposed levers fulcrumed in said casing, a float member carried by one of said levers, the other of said levers having an end portion operable to close said valve, the other end portion of said other lever overlying said float member for movement thereby and for free pivotal movement away from said float member, said other end portion being magnetic, and a magnetic member in said casing and cooperable with said magnetic other end portion to pivot said lever other end portion away from said float member thereby to cause said first-named end portion to close said valve.

6. In a liquid level control device, a casing having a chamber with an inlet having an upward facing valve seat, a vertically reciprocable valve member engageable with said seat to control flow into said casing, a float member responsive to liquid level in said casing, a lever fulcrumed within said casing, said lever having at one end a valve member engaging portion and having at its other end an armature portion, said armature portion overlying said float member and having a greater weight than said engaging portion so that said armature portion rests on said float member for movement therewith, said engaging portion overlying said valve member and being operable to move said valve member to closed position against said seat, and a permanent magnet fixed within said casing and overlying said armature portion and said float member and cooperable with said armature portion to move said engaging portion to close said valve, said float member being operable to lift said armature portion into cooperable relation to said magnet.

7. A liquid level control device comprising a casing having a liquid receiving chamber with an inlet, an upstanding guide member at said inlet, a vertically reciprocable valve member operable to regulate flow through and to close said inlet, said valve member being guided in said guide member and having a lateral flange, a lever fulcrumed in said casing and having an end portion engageable with said flange to lift said valve member, a float fixed to the other end of said lever, a second lever overlying and extending longitudinally of said first-named lever and having a fulcrum arm extending downward below the fulcrum of said first-named lever, means pivotally supporting said fulcrum arm, said second lever having an end portion overlying the upper end of said valve member in engageable relation thereto, an armature member on the other end of said second lever and being offset therefrom to seat on said float, said second lever other end having a greater weight than said second lever one end so that said armature member rests by gravity on said float, and a permanent magnet fixed in said casing in overlying relation to said armature member, said float being operable to raise said armature member into attractive relation to said magnet so that said second lever will be forcefully engaged with said valve member.

8. A liquid level control device comprising a casing having a liquid receiving chamber with an inlet, an upstanding guide member at said inlet, a vertically reciprocable valve member operable to regulate flow through and to close said inlet, said valve member being guided in said guide member and having a lateral flange, a lever fulcrumed in said casing and having an end portion engageable with said flange to lift said valve member, a float fixed to the other end of said lever, a safety float in said chamber, a second lever carrying said safety float, a safety lever overlying and extending longitudinally of said second lever and having a downward extending abutment engageable by one end of said second lever, said safety lever having an end portion overlying the upper end of said valve member in engageable relation thereto, an armature member on the other end of said safety lever and being constructed to seat on said float, said safety lever other end having a greater weight than said safety lever one end so that said armature member rests by gravity on said safety float, and a permanent magnet fixed in said casing in overlying relation to said armature member, said safety float being operable to raise said armature member into attractive relation to said magnet so that said safety lever will be forcefully engaged with said valve member, said second lever one end engaging said abutment upon lowering of said safety float thereby to raise said armature member into attractive relation to said magnet.

WALTER S. LANDON.

REFERENCES CITED

The following references are of record in the file of this patent:

UNITED STATES PATENTS

| Number | Name | Date |
|---|---|---|
| 1,556,817 | Higgins | Oct. 13, 1925 |
| 1,611,398 | Wiggins | Dec. 21, 1926 |
| 1,745,762 | Honiss | Feb. 4, 1930 |
| 1,770,913 | DeKermor | July 22, 1930 |
| 1,875,511 | Shivers | Sept. 6, 1932 |
| 2,067,836 | Foulds | Jan. 12, 1937 |
| 2,068,138 | Johnson | Jan. 19, 1937 |
| 2,090,695 | Miller | Aug. 24, 1937 |
| 2,110,100 | VonWangenheim | Mar. 1, 1938 |
| 2,139,616 | Foulds | Dec. 6, 1938 |
| 2,309,770 | Johnson | Feb. 2, 1943 |
| 2,320,457 | Hammell | June 1, 1943 |
| 2,387,858 | Russel | Oct. 30, 1945 |